April 18, 1950 H. L. WATERMAN 2,504,289
HARVESTER THRESHER WITH LEVELING PLATFORM
Original Filed Dec. 30, 1944 6 Sheets-Sheet 2
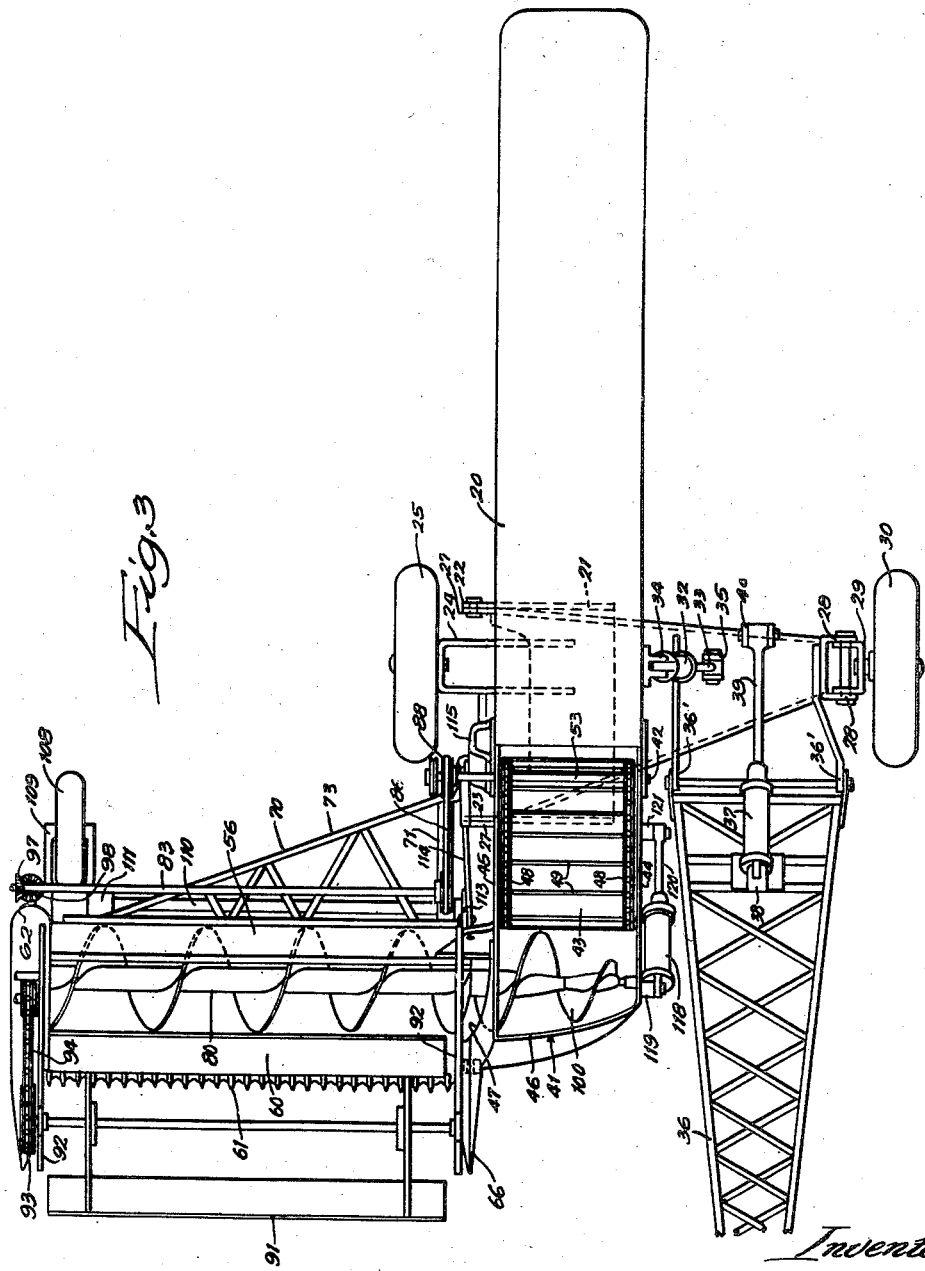
Inventor:
Howard L. Waterman,
By Paul O. Pippel.
Attorney.

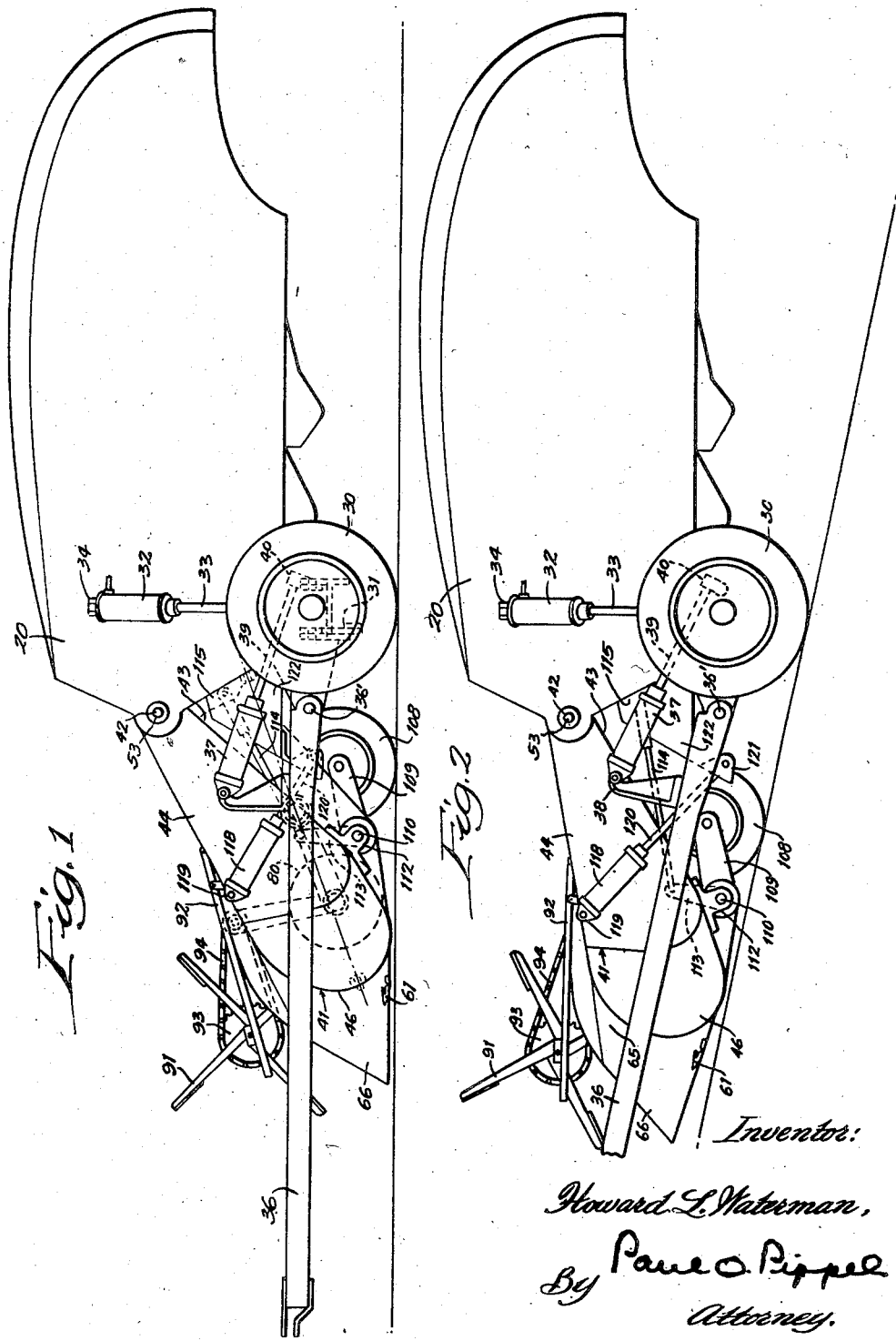

April 18, 1950     H. L. WATERMAN     2,504,289
HARVESTER THRESHER WITH LEVELING PLATFORM
Original Filed Dec. 30, 1944     6 Sheets-Sheet 3
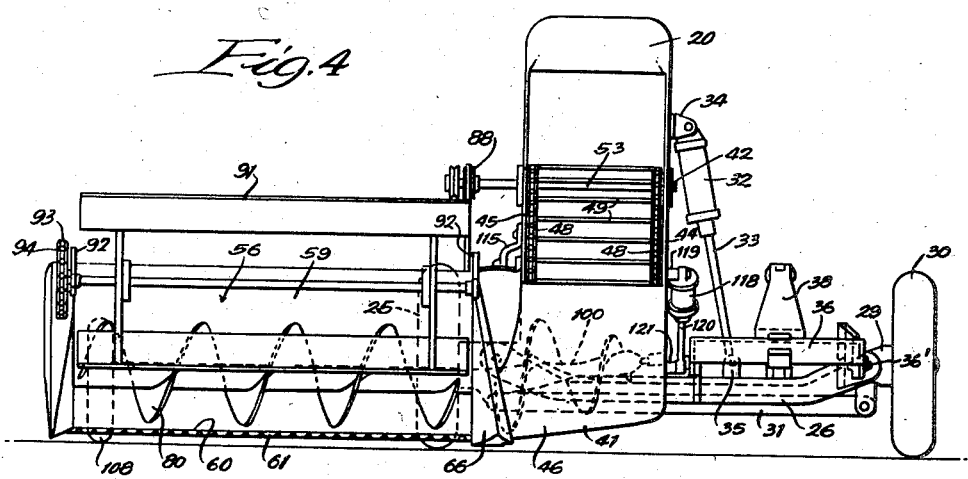
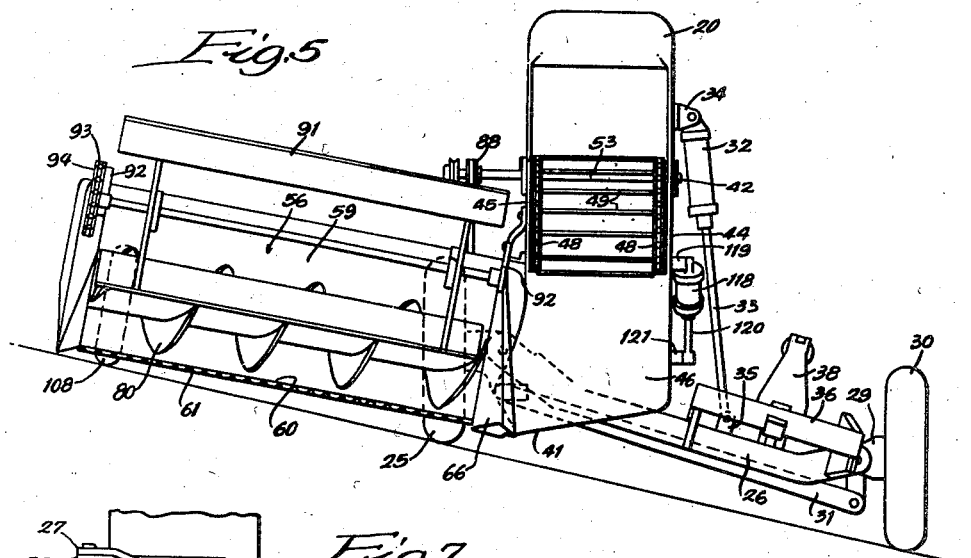
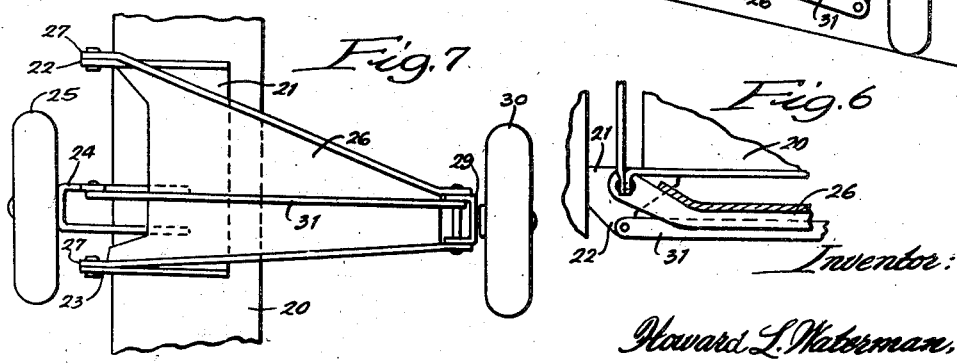
Inventor:
Havard L. Waterman,
By Paul O. Pippel
Attorney.

April 18, 1950 H. L. WATERMAN 2,504,289
HARVESTER THRESHER WITH LEVELING PLATFORM
Original Filed Dec. 30, 1944 6 Sheets-Sheet 4
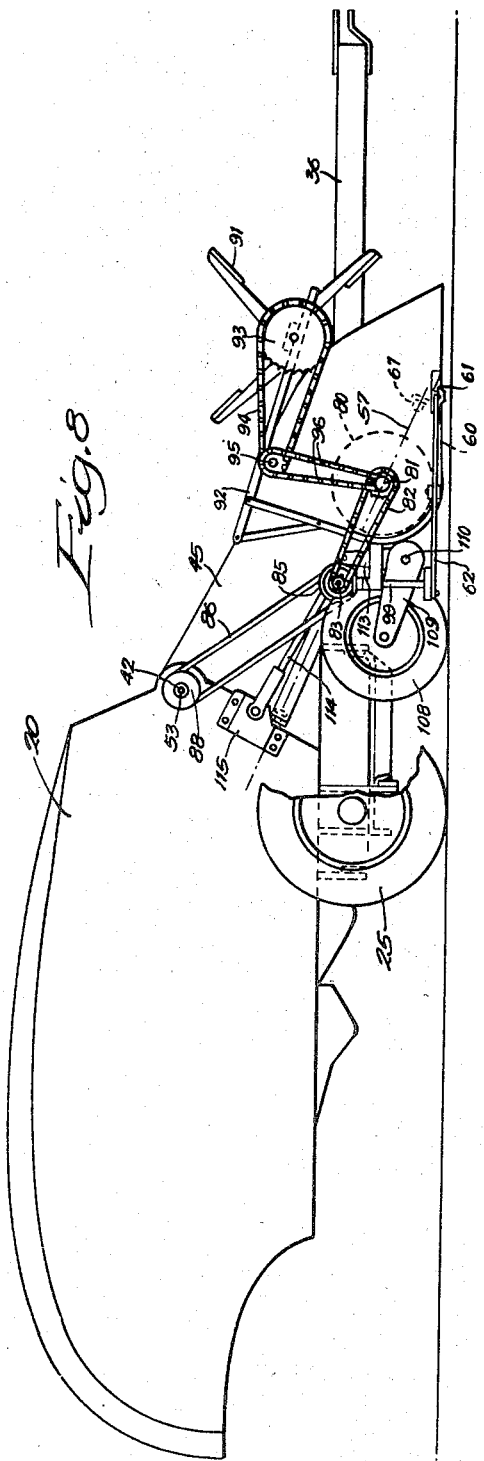
Inventor:
Howard L. Waterman.
By Paul C. Pippel
Attorney.

April 18, 1950          H. L. WATERMAN          2,504,289
HARVESTER THRESHER WITH LEVELING PLATFORM
Original Filed Dec. 30, 1944          6 Sheets-Sheet 5
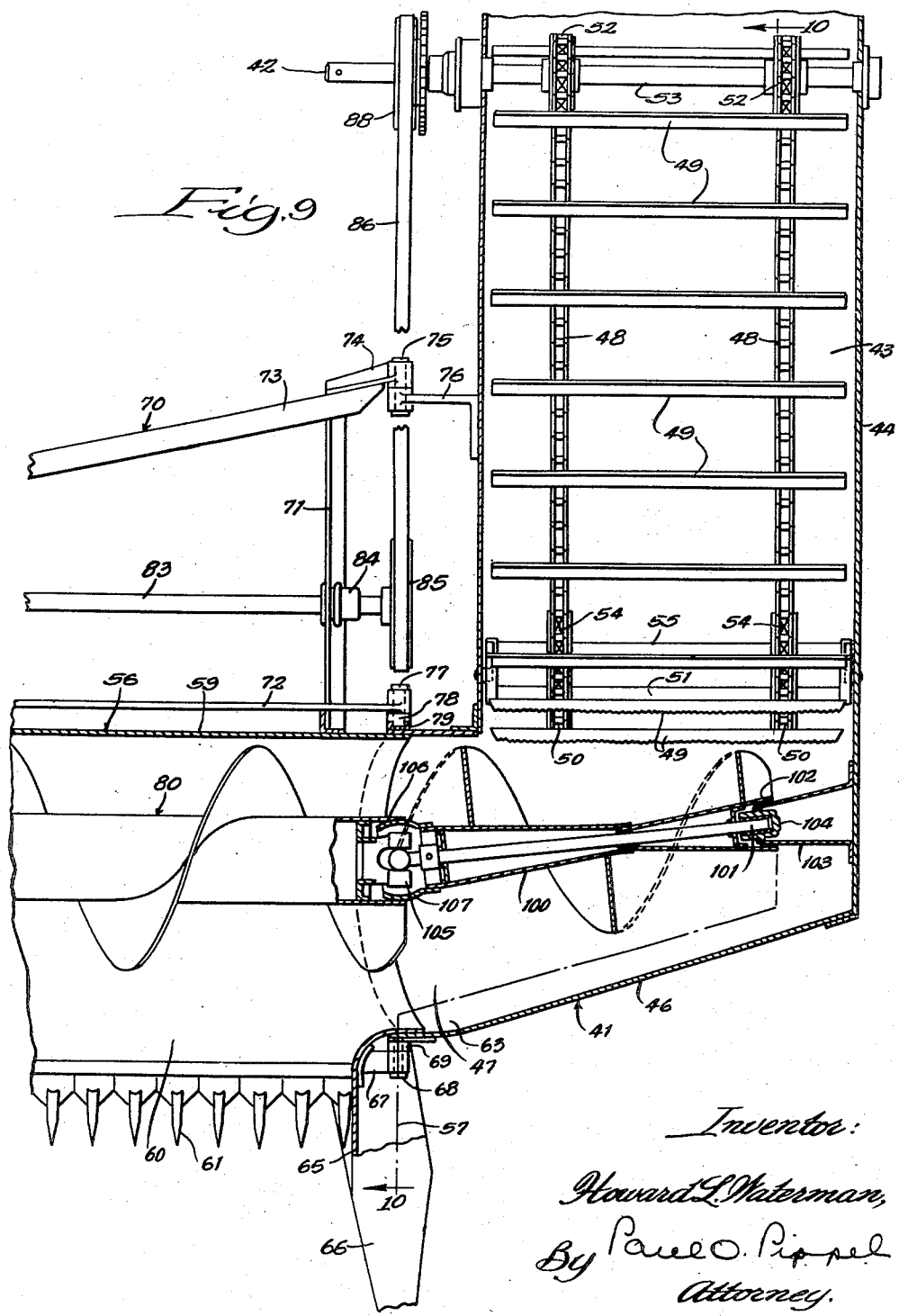

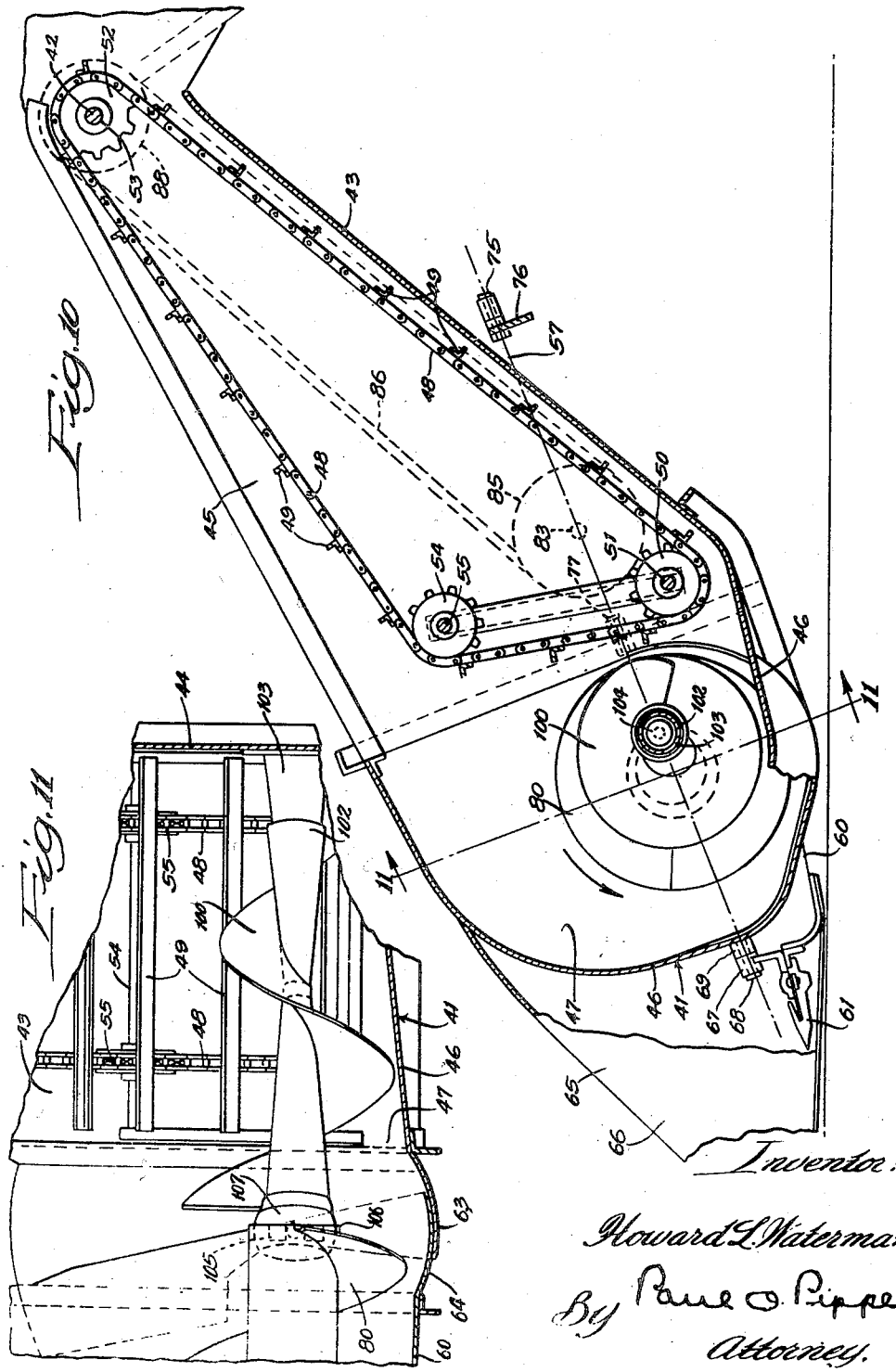

Patented Apr. 18, 1950

2,504,289

UNITED STATES PATENT OFFICE 2,504,289

HARVESTER THRESHER WITH LEVELING PLATFORM

Howard L. Waterman, Moline, Ill., assignor to International Harvester Company, a corporation of New Jersey Original application December 30, 1944, Serial No. 570,546. Divided and this application May 10, 1946, Serial No. 668,864

7 Claims. (Cl. 56—122)

This application is a division of my copending application Serial No. 570,546, filed December 30, 1944, now Patent 2,491,236 issued December 13, 1949.

The invention relates to a grain harvester. More specifically, it relates to a harvester thresher with leveling platform particularly adaptable for hillside operation.

In the design of traveling harvester-threshers, often designated as combines, one of the serious problems has been to maintain the thresher part in substantially horizontal position when the machine is operated on relatively steep hillsides. In order to maintain the efficiency of a grain separator of the conventional straw-walker and grain-pan type, it is necessary that the harvester-thresher be maintained in a substantially horizontal position both with respect to its longitudinal and transverse dimensions. Various types of supporting structure have been devised to accomplish generally this desired result. There are other problems in connection with the supporting of a floating platform, which must operate substantially parallel to the ground level, which are involved in side hill operation. It is particularly in connection with the flexibility of a laterally-extending grain platform in connection with leveling means for the thresher part of a harvester thresher that the present invention is concerned.

The above objects and others which will be apparent from the description to follow are attained by a construction such as shown in the drawings, in which:

Figure 1 is a side elevation of a harvester-thresher embodying the invention;

Figure 2 is an elevation showing the harvester-thresher of Figure 1 operating on a relatively steep hillside with the thresher body in leveled position;

Figure 3 is a plan view of the harvester-thresher of Figure 1;

Figure 4 is a front view of the harvester-thresher of Figure 1 as it would appear on level ground;

Figure 5 is a similar view showing the harvester-thresher on a steep side hill with the thresher body in leveled position;

Figure 6 is a detail view showing one of the connections of the leveling linkage beneath the thresher body;

Figure 7 is a bottom view of a portion of the harvester-thresher structure showing the leveling linkage in connection with the ground wheels;

Figure 8 is a side elevation view taken from the platform side of the machine;

Figure 9 is an enlarged view of a portion of the platform and the feeder housing with the feeder housing in section to show the feeding elements therein;

Figure 10 is a view taken on the line 10—10 of Figure 9; and

Figure 11 is a view taken on the line 11—11 of Figure 10.

The harvester-thresher illustrated in the drawings is adapted to be pulled behind a tractor and may be operated by a tractor power take-off or by a separate engine carried on the harvester-thresher structure in the position indicated by the dot-dash lines. The harvester-thresher is of the type in which the main portion of the weight is carried on two transversely aligned ground wheels and in which means are provided for moving the wheels with the thresher body whereby the wheels remain in a vertical position and whereby the thresher remains in its normal horizontal position. A side-connected platform is pivoted to a feeder housing which is in turn pivoted to the thresher body, the other end of the platform being wheel-supported. The invention resides in the particular means for articulating the various structures, and particularly in means for maintaining the platform in any of the various adjusted positions substantially parallel to the ground. This is an important feature, as the point of connection of the platform with the feeder housing varies with every adjustment of the thresher body about either a longitudinal or a transverse axis.

The provision of a feeder housing and a platform pivotally connected thereto requires a type of feed mechanism which is flexible and which operates at an angle of the platform with respect to the feeder housing. A positive simple type of auger feed is provided by connecting the end of a normal open-end auger to an extension auger with a universal joint, the other end of the extension auger being secured to the feeder housing. This particular feed may be accomplished by other constructions in which the auxiliary auger is substantially in alignment with the main feed auger and is in effect a continuation thereof.

In the drawings, many parts of the harvester-thresher have been shown only in outline as the invention resides primarily in the geographic location of various elements and their movements and adjustments relative thereto. No internal structure has been shown in the thresher body portion of the machine as any conventional threshing mechanism may be utilized.

The thresher body 20 is generally of the self-supporting type, being formed by sheet-metal housing sections welded or otherwise rigidly secured together whereby a rigid structure is provided with comparatively little bracing from auxiliary frame members. For that reason, the thresher body will be referred to as a unit in describing the various elements which are connected thereto or mounted thereon.

As best shown in Figure 6, a bracket structure 21 extends laterally from one side of the thresher body 20, being provided with two longitudinally spaced, downwardly extending bracket portions 22 and 23, said bracket portions being best shown in Figure 7. Between said bracket portions a wheel support 24, which may be a portion of the bracket structure 21, extends laterally outwardly beyond the bracket portions 23. A supporting wheel 25 is journaled on the support 24. Said wheel it at all times parallel to the thresher body as it is journaled upon the structure 24 which is rigid with respect to the thresher body.

A frame structure designated in its entirety by the reference character 26 has spaced connecting portions 27 which are pivotally secured on a longitudinal axis to the bracket portions 23 of the bracket structure 21. The frame structure 26 extends beneath the thresher body and laterally to the other side a substantal distance beyond the thresher body. Spaced connecting portions 28 on said frame structure are pivotally connected on a longitudinal axis to a second wheel support 29. Said support provides a supporting means for a second supporting wheel 30 which is transversely aligned with respect to the supporting wheel 25.

A stabilizing link in the form of a bar 31 is pivotally connected at its ends to downwardly extending portions of the wheel supports 24 and 29. Said bar, in connection with the frame structure 26, forms in effect a parallel linkage which confines the outwardly spaced supporting wheel 30 for vertical movement parallel to the ground wheel 25 while permitting tilting of the thresher body 20 with respect to the ground level. The bracket structure 21, the wheel supports 24 and 29, the frame structure 26, and the link 31 provide a wheeled supporting structure for the thresher body 20. To provide for such tilting movement, a hydraulic device having a cylinder 32 and an extended piston rod 33 is connected between a bracket 34 mounted on the spaced-wheel side of the thresher body 20 and a bracket 35 secured to the frame structure 26. By supplying liquid under pressure to the cylinder 32, the thresher body may be tilted with respect to the frame structure 26 whereby it may be leveled for hillside operation.

A draft frame structure 36 is pivotally connected on a transverse axis to spaced connecting portions 36' which extend forwardly from the frame structure 26. A hydraulic device is shown as providing an adjusting means for varying the angular position of the draft frame structure 36 with respect to the frame structure 26 and thereby altering the position of the thresher body 20 whereby said thresher body may be leveled to a horizontal position for various angular positions of the draft frame structure 36. It is assumed that said structure will be attached to the drawbar of a tractor which is substantially fixed with respect to its height above the ground level. The hydraulic device illustrated includes a cylinder 37 pivotally connected to a bracket 38 on the draft frame structure 36, and a piston-rod extension 39 pivotally connected to a bracket structure 40 on the frame structure 26.

A feeder housing 41 is pivotally connected on a transverse axis 42 to the front of the thresher body 20. This construction is conventional in traveling harvester-threshers to permit floating movement of the feeder housing with respect to the thresher part of the machine. Referring to Figures 9 and 10, which show the feeder housing 41 and the feeding mechanism therein: said housing includes an upwardly inclined bottom 43, spaced side walls 44 and 45, and a curved front wall structure 46. Said front wall structure is shaped to provide a large feed opening 47 for receiving material and is slanted rearwardly toward the side wall 44 to confine the material being fed and to assure its delivery into the vertical conveying means. Said vertical conveying means is in the form of what has been conventionally termed an overhead feeder. A conveyer mechanism having chains 48 and conveyor flights 49 spaced thereon operates over sprockets 50 on a transverse shaft 51, sprockets 52 on a transverse shaft 53, and sprockets 54 on a transverse shaft 55. The lower run of the conveyor operates sufficiently close to the bottom 43 and in an upward direction with respect thereto for engaging material and carrying it upwardly to be discharged at the upper end into the threshing mechanism of the thresher body 20.

A laterally extending grain platform, designated in its entirety by the reference character 56, extends laterally to the grain side of the machine from the feeder housing 41, being pivotally connected thereto on an axis indicated by the reference character 57, which is generally longitudinal of the machine, being slanted, however, upwardly to the rear. The grain platform is formed generally of sheet metal of sufficient weight to be self-supporting. Additional angle bars and other bracing means are secured to the sheet metal wherever required. Said grain platform has a back wall 59 curved forwardly at its lower portion and extending substantially horizontally in a forward direction to provide a flat grain-receiving portion 60. A conventional grain-cutting mechanism 61 is indicated as being along the forward edge of the portion 60. Said mechanism may be driven by any suitable source, a drive means 62 being indicated in Figure 8.

Adjacent the grain platform 56 and around the opening 47, the curved wall 46 of the feeder housing is provided with a generally cylindrical extension 63. Said extension, as best shown in Figure 11, is somewhat spherical at its outer end to provide for an overlapping fit of a similar extension flange 64 formed at the end of the back wall 59 and bottom portion 60 of the grain platform. This spherical fitting is provided so that a closely fitting joint may be obtained while permitting pivoting of the grain platform with respect to the feeder housing about the attaching structure, which will now be described.

At the feeder housing end of the grain platform 56, an upwardly-extending curved wall 65 provides a grain-retaining wall as well as forming a portion of the curved flange extension 64 previously mentioned. A grain divider 66 forms a continuation of the wall 65. A bracket 67 connected to the wall 65 extends laterally and is connected by a pivot pin 68 with a bracket 69 secured to the cylindrical extension 63 of the feeder housing.

At the rear of the grain platform 56 a braced supporting frame 70 extends from the outer end of the grain platform to a point adjacent the said wall 45 of the thresher body. Said frame includes a longitudinally-extending member 71, a transversely-extending bar 72 adjacent the grain platform, and a diagonally-extending bar 73. A bracket 74 secured to the bar 73 is pivoted by a pin 75, lying on the same axis as the pin 68, to a bracket 76 secured to the wall 45 and extending laterally outwardly therefrom. The bar 72 is secured by a pin 77, also lying on the same axis as the pin 68, to a bracket 78 carried by a reinforcing channel 79 at the outer edge of the cylindrical extension 63 of the feeder housing. The three pins 68, 75, 77 provide a pivot axis by means of which the grain platform and its associated structure are pivotally mounted on the feeder housing 41. As indicated both in Figures 8 and 10, said axis extends upwardly to the rear at a substantial angle.

An auger conveyor 80 extends the full length of the grain platform, being positioned to cooperate with the back wall 59 and the flat bottom 60 to feed grain cut by the sickle bar in an endwise direction towards the feeder housing. The auger 80 is supported entirely at its outer end by conventional means such as shown in the United States Patent No. 2,142,587. A laterally projecting drive shaft 81 for said auger is adapted to be driven by the drive chain 82 extending upwardly and rearwardly to a drive shaft 83 extending along the rear of the platform 56. Said shaft, as shown in Figure 9, is carried at the thresher side of the platform by a journal box 84 mounted on the bar 71. A pulley 85 is mounted on the end of the shaft 83, the center of said pulley lying substantially on the axis of connection of the grain platform to the feeder housing, as shown by the dotted-line position of the pulley in Figure 10 and by the full-line position of the pulley in Figure 8. A belt 86 connects the pulley 85 with a pulley 88 carried by the shaft 53. Said shaft, as previously described, also drives the feed conveyor chains 48. Said shaft also forms the pivot axis 42 by means of which the feeder housing is secured to the thresher body. Power may be delivered by any suitable means to the driving shaft 53, either from power take-off mechanism connected to the tractor or from a separate power plant mounted on the harvester thresher.

A reel assembly 91 is shown mounted in operative position above the grain platform. Said reel assembly is mounted on a supporting structure 92 extending upwardly and forwardly from the grain platform 56 at each end thereof. A drive sprocket 93 carried as a part of the reel assembly is connected by a drive chain 94 to an idler sprocket structure 95 which is in turn connected by the drive chain 96 with a sprocket on the shaft 81. By this means the reel is driven simultaneously with the auger conveyor.

Figures 3 and 8 also show additional elements of the sickle drive mechanism. A bevel gear 97 on the shaft 83 is positioned to drive a bevel gear 98 which is secured to a vertical shaft 99 at the lower end of which the sickle drive mechanism 62 is secured.

The auger 80, as previously stated, terminates adjacent the pivot axis of the grain platform 56 on the feeder housing 46. An auxiliary extension auger 100 is positioned in the housing 41 extending transversely thereof. Said auger is in effect a continuation of the auger 80 and is in substantially axial alignment therewith when the harvester-thresher is operating on level ground. One end of the auger 100, as shown in Figure 9, is provided with a shaft 101 which extends within an open-end sleeve portion 102. Said sleeve portion telescopically fits over a support 103 secured to the side wall 44 of the feeder housing extending substantially perpendicular therefrom. Said support carries a journal box 104 in which the shaft extension 101 is slidably and rotatably secured. It will be understood that the auxiliary auger 100 could be carried entirely on the wall 44 by the supporting means above described. In the embodiment illustrated, said auger is connected at what would be its free end to what would be the free end of the auger 80. Said connection is in the form of a universal joint, the center of which lies on the pivot axis of the grain platform 56 on the feeder housing 41. Said universal joint connection includes a double Y universal joint assembly 105, a projecting sleeve 106 on the auger 80, and a spherical shield 107 on the auger 100.

A grain wheel 108 is mounted on a crank axle construction 109 secured to a transversely extending shaft 110 which is rotatably mounted on the platform 56, one mounting bracket 111 being shown at the outer end of the platform in Figure 3. The other end of the shaft 110 is rotatably supported at the other end of the platform 56 by a bracket 112, as shown in Figures 1 and 2. An upwardly-extending lever 113 is secured to the end of the shaft 110, said lever terminating substantially on the pivot axis of the platform on the feeder housing. A link 114 is loosely pivoted to the upper end of the lever 113 extending upwardly substantially parallel to and lying close to the pivot axis of the platform on the feeder housing. At its upper end, said link is pivotally connected to a member 115. Said member is rigidly secured to the side of the thresher body 20. The shaft 110, the lever 113 and the link 114 constitute adjusting linkage to adjust the grain wheel 108 and thereby the outer end of the platform 56 in accordance with movements of the thresher body, thereby maintaining the platform substantially parallel to the ground during relative tilting movement of the body and platform.

The feeder housing 41 was described as being pivotally connected to the thresher body 20 on the axis 42. To provide for pivoting adjustment of said feeder housing, a hydraulic device is shown, said device having a cylinder 118 pivotally connected to a bracket 119, as shown in Figure 3, carried by the feeder housing 41. A piston rod extension 120 of the hydraulic means is pivotally secured to a bracket 121 carried by a forwardly-extending portion 122 of the thresher body 20.

In the operation of a harvesting machine having the construction as above described in detail, the hydraulic cylinder 32 provides means for taking care of transverse inclines, as illustrated by Figures 4 and 5. The parallel linkage provided by the frame structure 26 and the bar 31 maintains the wheels in parallel vertical relation with respect to the thresher body during all positions of adjustment by tipping the thresher body about a longitudinal axis.

The hydraulic cylinder 118 provides for raising and lowering the feeder housing 41 to take care of vertical platform adjustments for cutting the grain at different heights and also to provide for inclines in a longitudinal direction as illustrated by Figures 1 and 2. The adjustment of the thresher body into a horizontal position, as illustrated by Figures 1 and 2, is taken care of by the cylinder 37. Hydraulic connections and valves have not been indicated for the lifting and adjusting cylinders as any conventional control system may be utilized for supplying liquid under pressure to the said cylinders.

As the feeder housing 41 is lifted and lowered, it is also necessary to simultaneously adjust the outer end support for the platform. By means of the shaft 110, the crank axle 109, the lever 113, and the link 114, the outer end of the platform is raised and lowered substantially the same amount as the inner end whereby said platform remains substantially parallel to the ground. As shown in an extreme position on a steep slope in Figure 5, the cutter bar is slightly angled with respect to the ground but in all intermediate positions the cutter bar is practically parallel to the ground.

The feed cutter 80 transfers a crop endwise of the platform to the opening 47 at the lateral side of the feeder housing. The auxiliary auger 100 then engages the material and feeds it inwardly into the housing and into contact with the flights 49 of the feed conveyor. The shape of the end wall 46 of the housing provides a passage of decreasing cross section whereby the material is compressed into engagement with the feed conveyor. It will be noted, also, that the outside dimension of the auxiliary auger 100 decreases to correspond to the shape of the feed housing. The universal joint connection between the augers 80 and 100, by being constructed with its center line on the pivot axis of the platform on the feeder housing, provides driving means for the auxiliary auger without introducing any strains on the supporting means for either of the auger. By this construction a substantially continuous conveyor is provided while permitting flexibility of the platform with respect to the feeder housing.

It is to be understood that applicant has shown and described only a preferred embodiment of his improved harvester-thresher with leveling adjustments, a floating grain platform, and improved feeding means therefor, and that he claims as his invention all modifications falling within the scope of the appended claims.

What is claimed is:

1. In a harvester thresher having a longitudinally positioned thresher body, and a wheeled supporting structure for said body, means to tilt the body about transverse and longitudinal axes with respect to said supporting structure, a feeder housing pivotally secured to the thresher body on a transverse axis, an upwardly delivering conveying means in said housing, a grain platform pivoted to said housing on a generally longitudinal axis and extending laterally therefrom, a wheel supported at the other end of said platform for relative vertical movement with respect thereto, adjusting linkage connecting said wheel and the thresher body operative to maintain the platform substantially parallel to the ground during relative tilting of the thresher body, and grain transferring means on said platform.

2. In a harvester thresher having a longitudinally positioned thresher body and a wheeled supporting structure for said body, a leveling and adjusting mechanism comprising means to tilt the body about a transverse axis with respect to said supporting structure, a feeder housing pivotally secured to the thresher body on a transverse axis, an upwardly delivering conveying means in said housing, a grain platform pivoted to said housing at its inner end on a generally longitudinal axis and extending laterally therefrom, a wheeled support for the other end of said platform, and grain transferring means on the platform, said wheeled support including a wheel, a supporting member mounted for vertical movement relative to the platform, and linkage connecting said member with the harvester body and operable to adjust the outer end of the platform with tilting of the thresher body.

3. A harvester thresher comprising a thresher body, bracket structure on said thresher body, a wheel mounted thereon, a transverse frame structure pivoted to said bracket structure, a support pivoted to the transverse frame structure on a longitudinal axis, a wheel on said support, a link member below said frame structure and pivotally connected to the bracket structure and to the wheel support below the connection points of said bracket structure and said support with the transverse frame structure, a draft frame connected to the frame structure, means for adjusting the thresher body about a longitudinal axis with respect to the draft frame and about a transverse axis with respect to said frame structure, a feeder housing pivotally connected to the thresher body on a transverse axis, a harvester platform pivotally connected to said housing on a generally longitudinal axis, said platform extending laterally from the feeder housing, a wheel-supporting member at the outer end of the platform mounted for vertical movement relative to said platform, a wheel mounted on said member, a lever arm extending from the other end of said member, a link lying close to the pivot axis of the harvester platform on the feeder housing, said link being connected to the lever arm and to the harvester body, and linkage connecting said member with the thresher body operative to move said member in the same direction and substantially the same distance as the movement of the inner end of the platform.

4. A supporting, leveling and adjusting mechanism for a harvester thresher having a thresher body comprising a thresher body, a wheeled frame structure for supporting said thresher body, extensible means changing the angular position of the thresher body relative to said frame structure, a draft frame connected to the frame structure, a feeder housing pivotally connected to the thresher body on a transverse axis, a harvester platform pivotally connected to said housing on a generally longitudinal axis, said platform extending laterally from the feeder housing, a wheel-supporting member pivoted on a transverse axis on said harvester platform, a crank axle extending from said member at the outer end of the harvester platform, a wheel mounted on said axle, a lever arm extending from the other end of said member, a link lying close to the pivot axis of the harvester platform on the feeder housing, said link being connected to said lever arm and to the harvester body.

5. A harvester thresher comprising a thresher body, bracket structure on said thresher body, a wheel mounted thereon, a frame structure pivoted to said bracket structure and extending transversely therefrom, a support pivoted to the transverse frame structure on a longitudinal axis, a wheel on said support, a link member below said frame structure and pivotally connected to the bracket structure and to the wheel support below the connection points of said bracket structure and said support with the transverse frame structure, extensible means changing the angular position of the thresher body relative to said frame structure, a draft frame connected to the frame structure, means for adjusting the thresher body about a longitudinal axis with respect to the frame structure, a feeder housing pivotally connected to the thresher body on a transverse axis, a harvester platform pivotally connected to said housing on a generally longitudinal axis, said platform extending laterally from the feeder housing, a wheel-supporting member pivoted on a transverse axis on said harvester platform, a crank axle extending from said member at the outer end of the harvester platform, a wheel mounted on said axle, a lever arm extending from the other end of said member, a link lying close to the pivot axis of the harvester platform on the feeder housing, said link being connected to said lever arm and to the harvester body.

6. A harvester thresher comprising a thresher body, bracket structure extending laterally to one side of said thresher body, a wheel mounted thereon, a frame structure pivoted to said bracket structure and extending laterally under the thresher body, a support pivoted to the transverse frame structure on a longitudinal axis, a wheel on said support, a link member below said frame structure and pivotally connected to the bracket structure and to the wheel support below the connection points of said bracket structure and said support with the transverse frame structure, a draft frame connected to the frame structure, means for adjusting the thresher body about a longitudinal axis with respect to the draft frame and about a transverse axis with respect to said frame structure, a feeder housing pivotally connected to the thresher body on a transverse axis, a harvester platform pivotally connected to said housing on a generally longitudinal axis, said platform extending laterally from the feeder housing, a wheel-supporting member pivoted on a transverse axis on said harvester platform, a crank axle extending from said member at the outer end of the harvester platform, a wheel mounted on said axle, a lever arm extending from the other end of said member, and a link lying close to the pivot axis of the harvester platform on the feeder housing, said link being connected to the lever arm and to the harvester body.

7. A harvester thresher comprising a longitudinally extending thresher body, bracket structure extending laterally to one side of said thresher body, a supporting wheel mounted on a transverse axis on said bracket structure, a frame structure pivoted to said supporting structure and extending laterally under the thresher body at a substantial distance beyond the other side thereof, a supporting wheel, a support for said wheel pivoted to the transverse frame structure on a longitudinal axis, a frame member below said frame structure and pivotally connected to the bracket structure and to the wheel support below the connection points of said bracket structure and said support with the transverse frame structure thereby providing a substantially parallel linkage for maintaining said wheels parallel to each other and substantially parallel to the thresher body, a draft frame pivotally connected on a transverse axis to the frame structure between the remote wheel and the body, means for adjusting said frame structure with respect to said draft frame, means for adjusting the thresher body about a longitudinal axis with respect to the frame structure, a feeder housing pivotally connected at its rear end to the forward end of the thresher body, means for angularly adjusting said feeder housing with respect to the thresher body, a harvester platform pivotally connected to the housing structure on a downwardly and forwardly inclined axis, said platform extending laterally from the feeder housing at the side thereof opposite the draft frame, a wheel supporting member pivoted on a transverse axis on said harvester platform, a crank axle extending rearwardly from said member at the outer end of the harvester platform, a wheel mounted on said axle, a lever arm extending from the other end of said member, and a link lying close to the pivot axis of the harvester platform on the feeder housing, said link being connected at its lower end to said lever arm and at its upper end to the harvester body.

HOWARD L. WATERMAN.

REFERENCES CITED

The following references are of record in the file of this patent:

UNITED STATES PATENTS

| Number | Name | Date |
|---|---|---|
| 1,498,354 | Coburn | June 17, 1924 |
| 1,745,832 | Brown | Feb. 14, 1930 |
| 2,293,328 | Coburn | Aug. 18, 1942 |